US007488273B2

(12) United States Patent
Carl et al.

(10) Patent No.: US 7,488,273 B2
(45) Date of Patent: Feb. 10, 2009

(54) CYLINDER DEACTIVATION FOR A MOTORCYCLE ENGINE

(75) Inventors: Thomas Carl, Hartford, WI (US); Earnest Metz, Wales, WI (US); Matthew Peller, Milwaukee, WI (US); Benjamin Wright, Sullivan, WI (US); Kyle G. Wick, Menomonee Falls, WI (US); William P. Pari, Sussex, WI (US); David L. Zwart, Wauwatosa, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 403 days.

(21) Appl. No.: 11/427,801

(22) Filed: Jun. 30, 2006

(65) Prior Publication Data

US 2008/0004158 A1 Jan. 3, 2008

(51) Int. Cl.
*B60W 10/02* (2006.01)
*B60W 10/06* (2006.01)

(52) U.S. Cl. .................................................... 477/181

(58) Field of Classification Search .................. 477/181
See application file for complete search history.

(56) References Cited

U.S. PATENT DOCUMENTS

| | | | | |
|---|---|---|---|---|
| 6,023,929 | A | 2/2000 | Ma | |
| 6,655,353 | B1 | 12/2003 | Rayl | |
| 6,786,191 | B2 | 9/2004 | Foster | |
| 6,874,463 | B1 | 4/2005 | Bolander et al. | |
| 6,904,752 | B2 | 6/2005 | Foster et al. | |
| 6,915,781 | B2 | 7/2005 | Rayl | |
| 7,059,998 | B2 * | 6/2006 | Bolander et al. | 477/107 |
| 7,325,534 | B1 * | 2/2008 | Waters et al. | 123/432 |
| 2002/0162540 | A1 | 11/2002 | Matthews et al. | |
| 2004/0224819 | A1 | 11/2004 | Bauerle et al. | |
| 2005/0049108 | A1 | 3/2005 | Nishizawa et al. | |
| 2005/0065709 | A1 | 3/2005 | Cullen | |
| 2005/0172933 | A1 * | 8/2005 | Takeuchi et al. | 123/339.19 |
| 2005/0193980 | A1 | 9/2005 | Doering | |
| 2005/0257778 | A1 | 11/2005 | Albertson et al. | |
| 2008/0072869 | A1 * | 3/2008 | Maehara et al. | 123/198 F |

* cited by examiner

*Primary Examiner*—Sherry Estremsky
(74) *Attorney, Agent, or Firm*—Michael Best & Friedrich LLP

(57) ABSTRACT

A method of reducing heat produced by an internal combustion engine in a motorcycle. The method includes supplying fuel pulses to a combustion chamber at least once per engine cycle (consecutive engine cycles defining a series of consecutive fuel pulses), operating the motorcycle at a low speed condition, and withholding at least a portion of at least one fuel pulse from at least one subsequent engine cycle to the combustion chamber when operating the motorcycle at the low speed condition.

19 Claims, 4 Drawing Sheets

CYLINDER DEACTIVATION FOR A MOTORCYCLE ENGINE

FIELD OF THE INVENTION

The present invention relates to engines for motorcycles, and more particularly to methods of deactivating cylinders of motorcycle engines to control one or more engine parameters.

BACKGROUND

Motorcycle engines produce heat, which can cause rider discomfort. Under such conditions, it is desirable to reduce the heat produced by the engine. One method of reducing excessive heat in fuel injected engines includes eliminating some of the fuel injections in an engine cycle while the engine is still operating. To initiate elimination of fuel injection events, an engine control module considers a cylinder head temperature, a throttle position, and engine speed. When all of these parameters reach certain predefined values, one fuel injection per every four typical fuel injections is eliminated. If the cylinder head temperature does not drop to a predefined value, two out of every four typical fuel injections are eliminated. The eliminated fuel injections are reactivated when at least one of these parameters no longer meets its predefined value. To smooth reactivation when two out of four fuel injections are eliminated, one out of every four fuel injections is eliminated for a brief period of time before reactivating all of the fuel pulses. When reactivated, the previously-eliminated pulse is delivered according to the normal fuel-demand characteristics (i.e., the fuel pulse is not modified or compensated due to reactivation). The fuel injections are not eliminated when the motorcycle is idling or moving at very low speeds.

SUMMARY

The present invention provides a method of reducing heat produced by an internal combustion engine in a motorcycle. The method includes supplying fuel pulses to a combustion chamber at least once per engine cycle (consecutive engine cycles defining a series of consecutive fuel pulses), operating the motorcycle at a low speed condition, and withholding at least a portion of at least one fuel pulse from at least one subsequent engine cycle to the combustion chamber when operating the motorcycle at the low speed condition.

The present invention further provides a method of deactivating and reactivating a cylinder in a motorcycle engine. The method includes supplying fuel pulses of a predefined pulse duration according to programmed conditions to a combustion chamber at least once per engine cycle (consecutive engine cycles defining a series of consecutive fuel pulses), deactivating the at least one cylinder by at least partially withholding fuel pulses to the combustion chamber when a deactivation condition is satisfied, and reactivating the at least one cylinder when a reactivation condition is satisfied by resuming the supply of fuel pulses to the combustion chamber and by extending the predefined duration of the first fuel pulse supplied to the at least one cylinder.

The present invention further provides a method of reducing heat produced by an internal combustion engine in a motorcycle. The method includes measuring a parameter, wherein the parameter is one of a length of time the motorcycle operates above a predefined speed, engine oil temperature, and cylinder head temperature, supplying fuel to the at least one cylinder in a series of fuel pulses, withholding at least one fuel pulse when the parameter exceeds a first predefined value, and reactivating the at least one fuel pulse when the parameter reaches a second predefined value.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
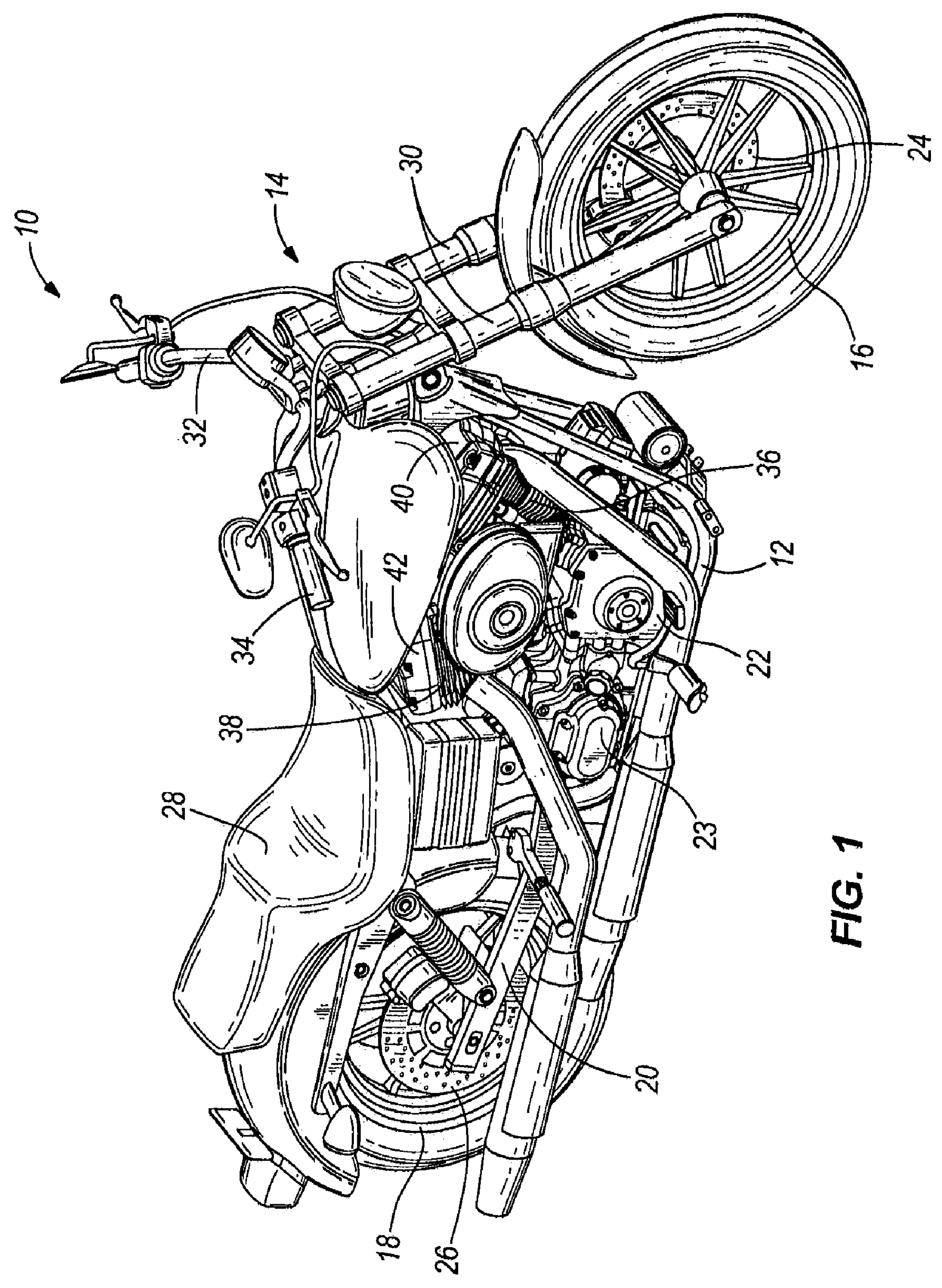
FIG. 1 is a perspective view of a motorcycle including an internal combustion engine embodying the present invention.

FIG. 1 illustrates a motorcycle 10 including a frame 12, a steering assembly 14 pivotably mounted to a forward portion of the frame 12, a front wheel 16 rotatably mounted to an end of the steering assembly 14, a rear wheel 18 rotatably mounted to a swing arm 20 that is pivotably connected to a rearward portion of the frame 12, and an engine 22 and transmission 23 mounted to the frame 12 and operably coupled to the rear wheel 18. The front wheel 16 includes a front rotor 24 and the rear wheel 18 includes a rear rotor 26. A seat 28 is coupled to the frame 12 above the rear wheel 18 to support an operator. The steering assembly 14 includes a fork 30, handlebars 32, and controls, such as a throttle grip 34, coupled to the handlebars 32. The operator manipulates the controls to power the engine 22 and transmission 23, drive the rear wheel 18, and propel the motorcycle 10. The operator maneuvers the handlebars 32 to pivot the steering assembly 14 and front wheel 16 to steer the motorcycle 10 while the motorcycle 10 is moving.

The engine 22 is an internal combustion engine, and in the illustrated embodiment includes a first or front cylinder 36 and a second or rear cylinder 38. In other embodiments, the engine 22 can include more or less than two cylinders arranged in any suitable fashion such as, for example, a "V" configuration, an opposed configuration, or an inline configuration. A first or front cylinder head 40 and a second or rear cylinder head 42 are connected to the top of the front and rear cylinders 36, 38, respectively. The heads 40, 42 include intake and exhaust valves (not shown) configured to open and close to control the flow of combustion air and fuel into the cylinders 36, 38, and the flow of exhaust out of the cylinders 36, 38. The valves can be mechanically actuated with a cam shaft, or can alternatively be electronically actuated by an engine control module ("ECM").

The ECM is configured to communicate with sensors to measure various parameters of the engine 22 and motorcycle 10. Some of these parameters include:

- Elapsed time
- Front and rear cylinder head temperatures
- Engine oil temperature
- Vehicle speed (speed of the motorcycle 10)
- Engine speed (measured in revolutions per minute ("RPM") of the engine 22)
- Throttle position (manipulated by rotation of the throttle grip 34 and measured as a percentage of a completely open throttle)
- Gear position (the gear currently selected in the transmission 23)
- Clutch position (engaged or disengaged)
- Acceleration enrichment (increased fuel supplied to the combustion chamber when the throttle position increases)

The ECM also controls a fuel injection system to supply fuel to the cylinders 36, 38. The fuel injection system includes fuel injectors that are opened to supply fuel to the cylinders 36, 38 (through a throttle body) in a series of pulses. The fuel injectors are held open for specified durations to vary the quantity of fuel delivered to the cylinders 36, 38 during each pulse. At least one fuel pulse is delivered to each cylinder 36, 38 during a complete cycle of the engine 22. The duration the injectors are held open is dependent upon a number of parameters including throttle position, air mass flow rate, and engine speed. As mentioned above, the ECM senses the rotational position of the throttle grip 34, and instructs the fuel injection system to increase or decrease the duration of the fuel pulses, depending on how far the throttle grip 34 is rotated.

An operator of the motorcycle 10 may experience discomfort from heat produced by the engine 22 under certain low speed conditions, such as idling or traveling slowly in high ambient temperatures. The ECM is configured to completely or partially deactivate at least one of the cylinders 36, 38 to decrease the amount of heat generated and increase the comfort of a rider. The cylinders 36, 38 can be deactivated by withholding some or all of the fuel pulses supplied to one or both cylinders 36, 38 at low speed conditions, and thus eliminate the combustion and heat production in the deactivated cylinder(s).

A deactivated cylinder can be either partially deactivated or completely deactivated. A cylinder is considered to be partially deactivated when one or more fuel pulses (regardless of sequential position) are withheld from a consistent or variable number of consecutive pulses. For example, one out of every four pulses could be withheld, two out of every five (i.e., the first and second, the first and third, the first and fourth, or the first and fifth), three out of every seven, and so on. The cylinder is considered to be completely deactivated when a series of consecutive pulses are withheld until reactivation conditions are met.

In the illustrated embodiment, the rear cylinder 38 is completely deactivated by withholding all fuel pulses to the rear cylinder 38 under the low speed conditions. The rear cylinder 38 is chosen because it is much closer to an operator's legs than the front cylinder 36. In other embodiments, the front cylinder 36 can be completely deactivated by withholding all of the fuel pulses to the front cylinder 36, or one or both cylinders 36, 38 can be individually or simultaneously partially deactivated by withholding only some of the fuel pulses to either or both of the cylinders 36, 38.

The ECM follows predefined processes to determine when to deactivate the rear cylinder 38, and when to reactivate the rear cylinder 38 to help ensure the motorcycle 10 functions normally.

Figure 2:
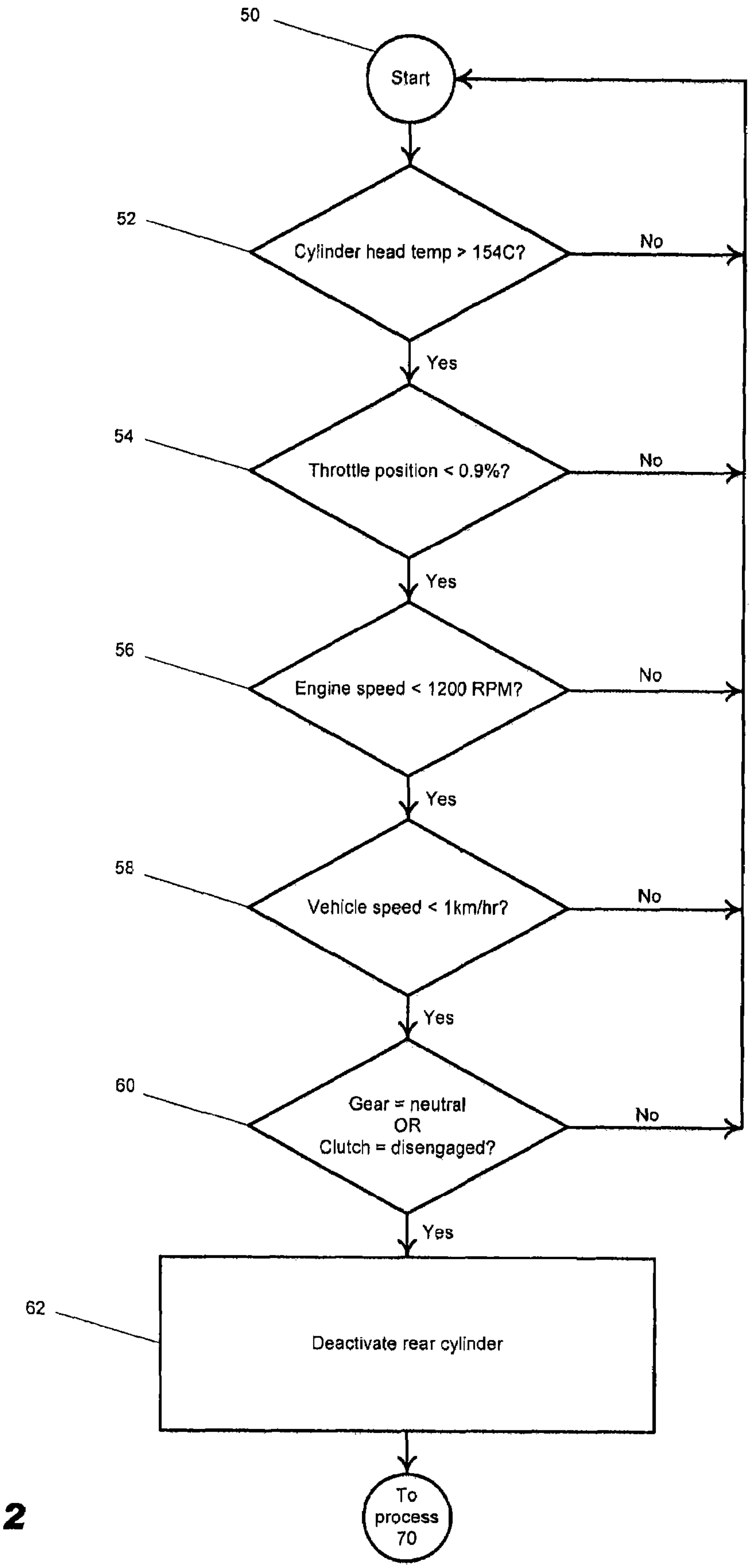
FIG. 2 is a flowchart illustrating a process according to one embodiment of the present invention to determine if a cylinder of the engine of FIG. 1 should be deactivated.

FIG. 2 illustrates a cylinder deactivation process 50 followed by the ECM to determine if the rear cylinder 38 should be deactivated. When the ignition of the motorcycle is "on" and the engine 22 is running, the process 50 begins by measuring the temperature of the engine 22 (step 52) at one of the cylinder heads 40, 42. In the illustrated embodiment, only the temperature of the front cylinder head 40 is considered. In other embodiments, the temperature of the rear cylinder head 42, or both cylinder heads 40, 42 can be considered. If the temperature of the front cylinder head 40 is greater than a predefined front cylinder head temperature (approximately 154 C, for example), the process 50 advances to step 54. If the temperature of the front cylinder head 40 is less than the predefined front cylinder head temperature, the process 50 starts over.

Step 54 includes measuring the position of the throttle. If the position of the throttle is less than a predefined throttle position (approximately 0.9% throttle, for example, wherein 100% is completely open throttle), the process 50 advances to step 56. If the position of the throttle is greater than the predefined throttle position, the process 50 starts over.

Step 56 includes measuring the engine speed. If the engine speed is less than a predefined engine speed (approximately 1200 RPM, for example), the process 50 advances to step 58. If the engine speed is greater than the predefined engine speed, the process 50 starts over.

Step 58 includes measuring the vehicle speed. If the vehicle speed is less than a predefined vehicle speed (approximately 1 km/hr, for example), the process 50 advances to step 60. If the vehicle speed is greater than the predefined vehicle speed, the process 50 starts over.

Step 60 includes considering the selected gear and the clutch position. If the selected gear is equal to a predefined gear value (neutral, for example), or the clutch position is equal to a predefined clutch value (disengaged, for example), the process 50 advances to step 62. If the selected gear is equal to a value other than the predefined gear value or the clutch position is equal to a value other than the predefined clutch value, the process 50 starts over.

Step 62 includes deactivating the rear cylinder 38. The valves in the rear cylinder head 42 continue to function normally when the rear cylinder 38 is deactivated such that air is pumped through the rear cylinder 38 without combusting. The pumped air helps to further cool the rear cylinder 38.

Figure 3:
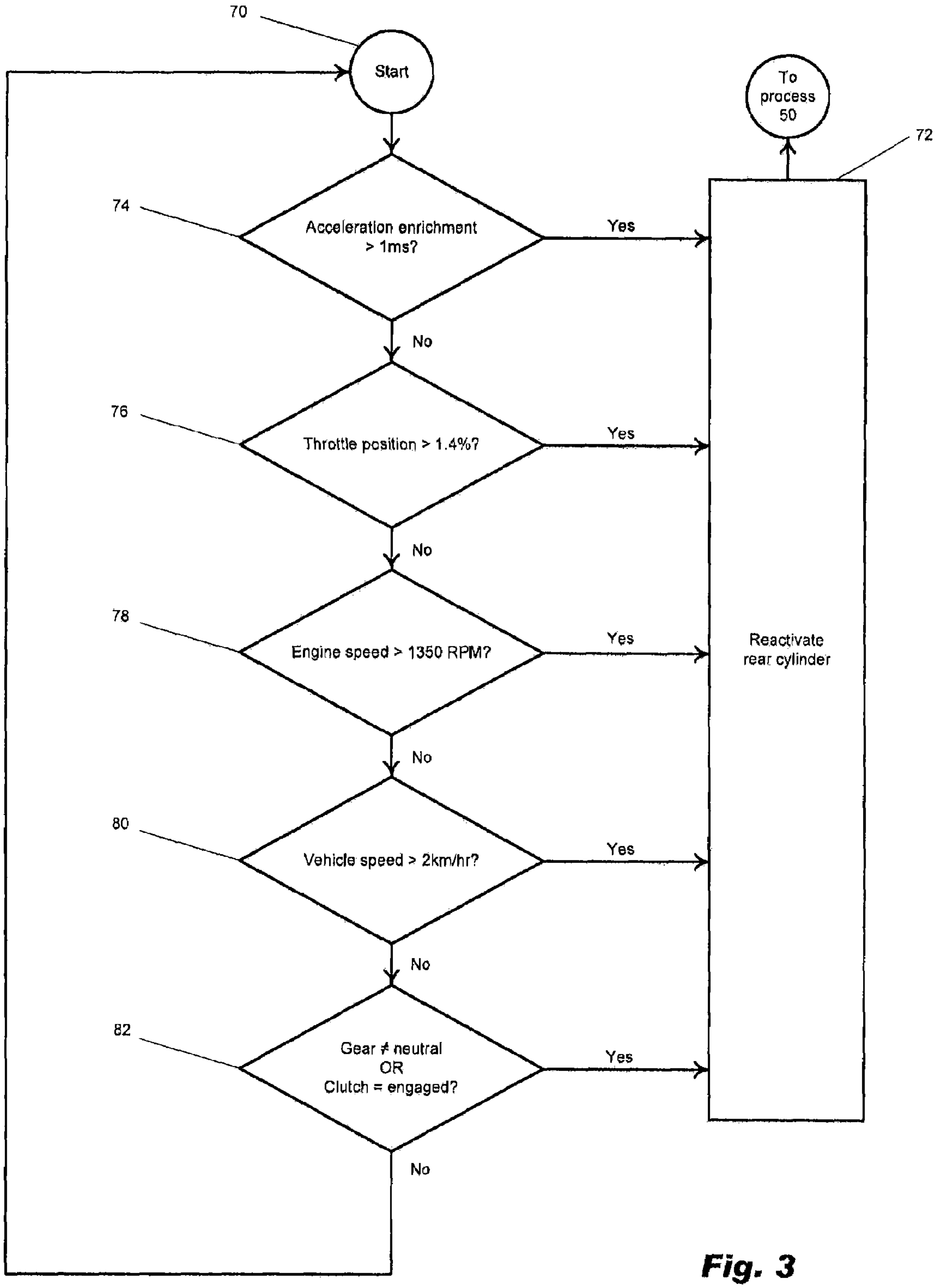
FIG. 3 is a flowchart illustrating a process according to another embodiment of the present invention to determine if a deactivated cylinder of the engine of FIG. 1 should be reactivated.

While the rear cylinder 38 is deactivated, the ECM considers a process 70 (FIG. 3) to determine if the deactivated rear cylinder 38 should be reactivated. Reactivation of the rear cylinder 38 (step 72) includes resuming all fuel pulses to the rear cylinder 38. The path from the fuel injector to the cylinder may become dry when the rear cylinder 38 is deactivated. Thus during reactivation, some of the fuel from the resumed fuel pulses will be used to re-wet the path, and not all of the fuel in the fuel pulse will be delivered to the rear cylinder 38. This makes it difficult to reactivate the rear cylinder 38 seamlessly without causing a torque disturbance that can be felt by an operator. To make the reactivation as smooth as possible, an additional quantity or burst of fuel is supplied to the rear cylinder 38 upon reactivation to compensate for the fuel lost when the re-wetting the path from the fuel injector to the rear cylinder 38. The burst can be an increase in the duration of the first fuel pulse supplied to the rear cylinder 38 from the fuel injector (an additional 3.2 milliseconds, for example). In some embodiments, the duration of the first fuel pulse at reactivation is double the typical programmed duration for the engine parameters at that instant. In other embodiments, the duration of the burst can be varied or tuned by an operator to make the reactivation as smooth as possible.

The process 70 begins by measuring the acceleration enrichment of the engine 22 (step 74). Acceleration enrichment is an increase in the duration of a fuel pulse (compared to the prior fuel pulse) supplied to the combustion chamber (in the cylinder that is not deactivated) when the throttle is opened. If the acceleration enrichment is greater than a predefined acceleration enrichment value (approximately 1 millisecond, for example), the process 70 advances to step 72 to reactivate the rear cylinder. If the acceleration enrichment is less than the predefined acceleration enrichment value, the process 70 advances to step 76.

Step 76 includes measuring the position of the throttle. If the position of the throttle is greater than a predefined throttle position (approximately 1.4% throttle, for example, wherein 100% is completely open throttle), the process 70 advances to step 72. If the position of the throttle is less than the predefined throttle position, the process 70 advances to step 78.

Step 78 includes measuring the engine speed. If the engine speed is greater than a predefined engine speed (approximately 1350 RPM, for example), the process 70 advances to step 72. If the engine speed is less than the predefined engine speed, the process 70 advances to step 80.

Step 80 includes measuring the vehicle speed. If the vehicle speed is greater than a predefined vehicle speed (approximately 2 km/hr, for example), the process 70 advances to step 72. If the vehicle speed is less than the predefined vehicle speed, the process 70 advances to step 82.

Step 82 includes considering the selected gear and the clutch position. If the selected gear is equal to a predefined gear value (any gear other than neutral, for example), or the clutch position is equal to a predefined clutch value (engaged, for example), the process 70 advances to step 72. If the selected gear is equal to a value other than the predefined gear value or the clutch position is equal to a value other than the predefined clutch value, the process 70 starts over.

The engine 22 also produces heat under high speed and/or high load conditions. For instance, if the motorcycle 10 is operated at its maximum operating speed for a certain period of time, the engine may become hot and uncomfortable to the operator. Under such conditions, the ECM is configured to completely or partially deactivate at least one of the cylinders 36, 38 to slow the motorcycle 10 and lower the temperature of the engine 22. The cylinders 36, 38 can be deactivated by withholding some or all of the fuel pulses supplied to one or both cylinders 36, 38, and thus eliminate the combustion and heat production in the respective cylinder(s).

In the illustrated embodiment, both the front and rear cylinders 36, 38 are partially deactivated under the above described high speed conditions. The front and rear cylinders 36, 38 are partially deactivated by withholding some of the fuel pulses to both of the front and rear cylinders 36, 38 in a programmed pattern. Withholding fuel pulses in this manner decreases the power output of the engine 22 and lowers the speed of the motorcycle 10 (vehicle speed), which lowers the temperature of the engine 22. In other embodiments, the front or rear cylinder 36, 38 can be completely deactivated by withholding all of the fuel pulses to the front or rear cylinder 36, 38, or just one of the cylinders 36, 38 can be partially deactivated by withholding only some of the fuel pulses to either or both of the cylinders 36, 38.

The ECM follows a predefined process to determine when to partially deactivate the cylinders 36, 38 to help ensure the motorcycle 10 functions normally.

Figure 4:
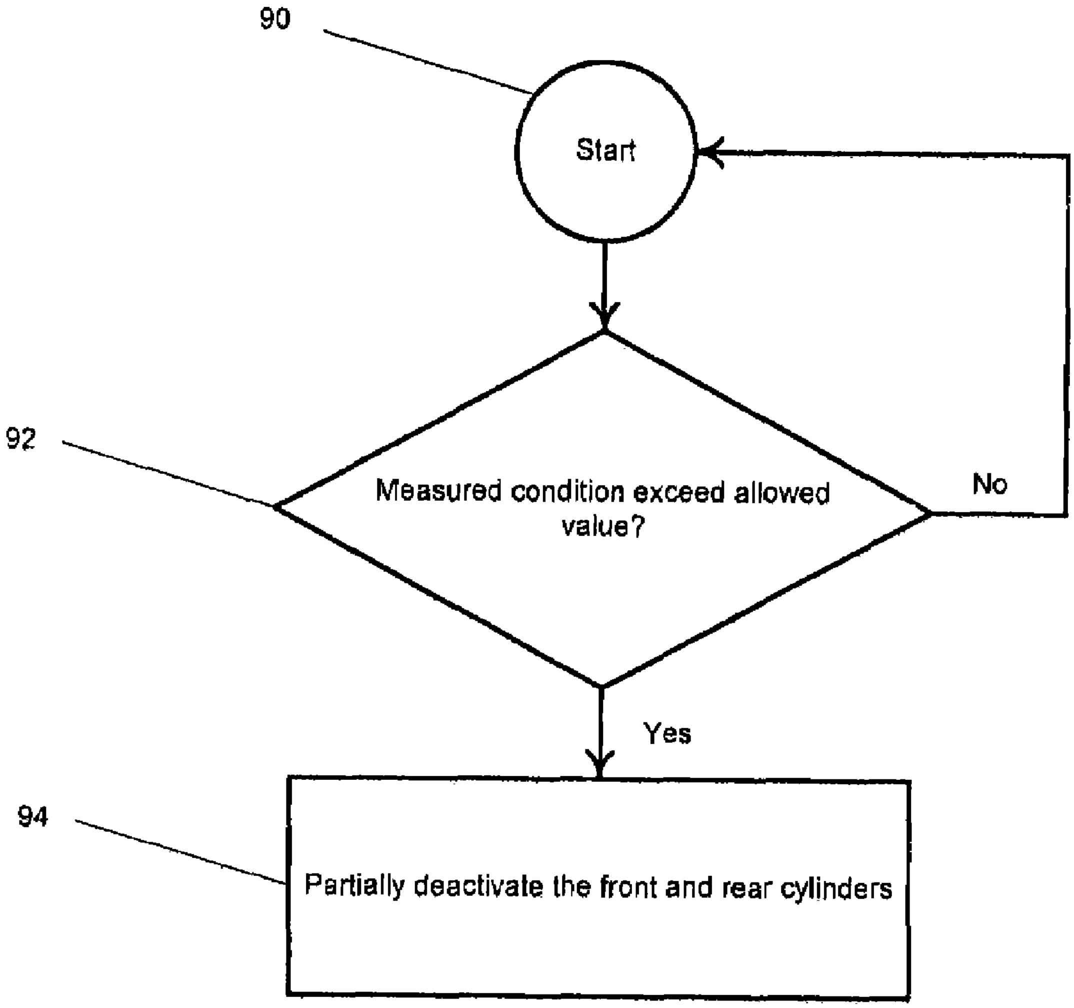
FIG. 4 is a flowchart illustrating a process according to another embodiment of the present invention to determine if a cylinder of the engine of FIG. 1 should be deactivated.

FIG. 4 illustrates a cylinder deactivation process 90 followed by the ECM to determine if the cylinders 36, 38 should be partially deactivated. The process 90 begins by measuring a motorcycle 10 or engine 22 condition (step 92). If the measured condition satisfies a predetermined condition, the process advances to step 94, which is partial deactivation of the cylinders 36, 38. If the measured condition does not satisfy the predetermined condition, the cylinders 36, 38 remain completely active and the process 90 starts over. Once the cylinders 36, 38 have been partially deactivated, they remain partially deactivated until the measured condition no longer satisfies the requirements in step 92. To minimize excessive deactivation and reactivation of the cylinders 36, 38, the condition required for reactivation of the cylinders 36, 38 can be slightly greater than or less than the condition required for deactivation.

The condition in step 92 can be a predefined vehicle speed and the time spent at or above a predetermined vehicle speed. For example, if the measured vehicle speed remains over 183 kilometers per hour for a predefined period of time, the process 90 advances to step 94. If the measured vehicle speed drops below the predetermined vehicle speed before a predefined period of time is reached, the process 90 starts over without partial deactivation of the cylinders 36, 38.

The condition in step 92 can also be a predefined engine oil temperature. If the engine oil temperature exceeds the predefined engine oil temperature (149 C, for example), the process 90 advances to step 94. If the engine oil temperature does not exceed the predefined engine oil temperature, the process 90 starts over without partial deactivation of the cylinders 36, 38.

The condition in step 92 can also be a predefined cylinder head temperature. In the illustrated embodiment, only the temperature of the front cylinder head 40 is considered. In other embodiments, the temperature of the rear cylinder head 42, or both cylinder heads 40, 42 can be considered. If the temperature of the front cylinder head 40 is greater than the predefined cylinder head temperature (approximately 302 C, for example), the process 90 advances to step 94. If the temperature of the front cylinder head 40 is less than the predefined cylinder head temperature, the process 90 starts over without partial deactivation of the cylinders 36, 38.

Thus, the invention provides, among other things, a cylinder deactivation process for lowering engine temperature in a motorcycle in both low speed and high speed conditions. Various features and advantages of the invention are set forth in the following claims.

The invention claimed is:

1. A method of reducing heat produced by an internal combustion engine in a motorcycle, the method comprising:

providing a motorcycle including an internal combustion engine, the internal combustion engine including at least one cylinder at least partially defining a combustion chamber;

supplying fuel pulses to the combustion chamber at least once per engine cycle;

operating the motorcycle at a low speed condition;

withholding at least a portion of at least one fuel pulse from at least one engine cycle to the combustion chamber when operating the motorcycle at the low speed condition; and resuming fuel pulses at every engine cycle to the combustion chamber when the motorcycle is no longer operating at the low speed condition, wherein the motorcycle is no longer operating at the low speed condition when at least one of the following conditions is met;

an engaged clutch position, and an acceleration enrichment greater than 1 millisecond.

2. The method of claim 1, further comprising withholding all fuel pulses to a rear cylinder when operating the motorcycle at the low speed condition.

3. The method of claim 1, wherein the low speed condition includes idling.

4. The method of claim 1, wherein the low speed condition includes at least one of the following conditions:

a throttle position less than 0.9% of an open throttle;

an engine speed less than 1200 revolutions per minute;

a vehicle speed less than 1 kilometer per hour; and a neutral gear position or a disengaged clutch position.

5. The method of claim 1, wherein the engine includes at least one cylinder head, and at least one valve in the cylinder head, the method further comprising: measuring the cylinder head temperature; and defining a cut-off temperature; and wherein withholding at least a portion of at least one fuel pulse includes withholding at least one fuel pulse when the cylinder head temperature reaches the cut-off temperature.

6. The method of claim 5, further comprising operating the at least one valve normally while withholding the at least one fuel pulse.

7. The method of claim 1, wherein the motorcycle is no longer operating at the low speed condition when at least one of the following conditions is met:

a throttle position greater than 1.4% of an open throttle;

an engine speed greater than 1350 revolutions per minute; and a vehicle speed greater than 2 kilometers per hour.

8. The method of claim 1, wherein resuming fuel pulses is not dependent upon engine temperature.

9. The method of claim 1, wherein resuming the fuel pulses is performed seamlessly by supplying an increased quantity of fuel to the combustion chamber for a predefined duration as the fuel pulses are resumed to reduce torque disturbances produced by resuming the fuel pulses.

10. A method of deactivating and reactivating a cylinder in a motorcycle engine, the method comprising:

providing a motorcycle including an internal combustion engine, the internal combustion engine including at least one cylinder defining a combustion chamber;

supplying fuel pulses of a predefined pulse duration according to programmed conditions to the combustion chamber at least once per engine cycle, consecutive engine cycles defining a series of consecutive fuel pulses;

deactivating the at least one cylinder by at least partially withholding fuel pulses to the combustion chamber when a deactivation condition is satisfied; and reactivating the at least one cylinder when a reactivation condition is satisfied by resuming the supply of fuel pulses to the combustion chamber and by extending the predefined duration of a reactivation fuel pulse supplied to the combustion chamber during reactivation of the at least one cylinder.

11. The method of claim 10, wherein the duration of the reactivation fuel pulse is variable by a user.

12. The method of claim 10, wherein the duration of the reactivation fuel pulse is about 3.2 milliseconds.

13. The method of claim 10, wherein the reactivation condition is satisfied when an acceleration enrichment exceeds a predefined acceleration enrichment value.

14. The method of claim 10, wherein the reactivation condition is satisfied when a throttle position exceeds a predefined throttle position value.

15. The method of claim 10, wherein the reactivation condition is satisfied when an engine speed exceeds a predefined engine speed value.

16. The method of claim 10, wherein the reactivation condition is satisfied when a vehicle speed exceeds a predefined vehicle speed value.

17. The method of claim 10, wherein the reactivation condition is satisfied when a gear position and a clutch position meet predefined gear position and clutch position values.

18. The method of claim 10, wherein extending the predetermined duration includes extending the predetermined duration of the reactivation fuel pulse to a duration that is approximately twice the predetermined duration.

19. A method of reducing heat produced by an internal combustion engine in a motorcycle, the method comprising:

providing a motorcycle including an internal combustion engine, the internal combustion engine including at least one cylinder and at least one cylinder head;

measuring a parameter, wherein the parameter is a length of time the motorcycle operates above a predefined speed;

supplying fuel to the at least one cylinder in a series of fuel pulses; and withholding at least one fuel pulse when the parameter exceeds a first predefined value.

* * * * *